D. J. HANNA & F. H. VAN HOUTEN.
BEARING AND PACKING GLAND FOR MIXING MACHINES.
APPLICATION FILED JAN. 8, 1913.
1,093,620.
Patented Apr. 21, 1914.
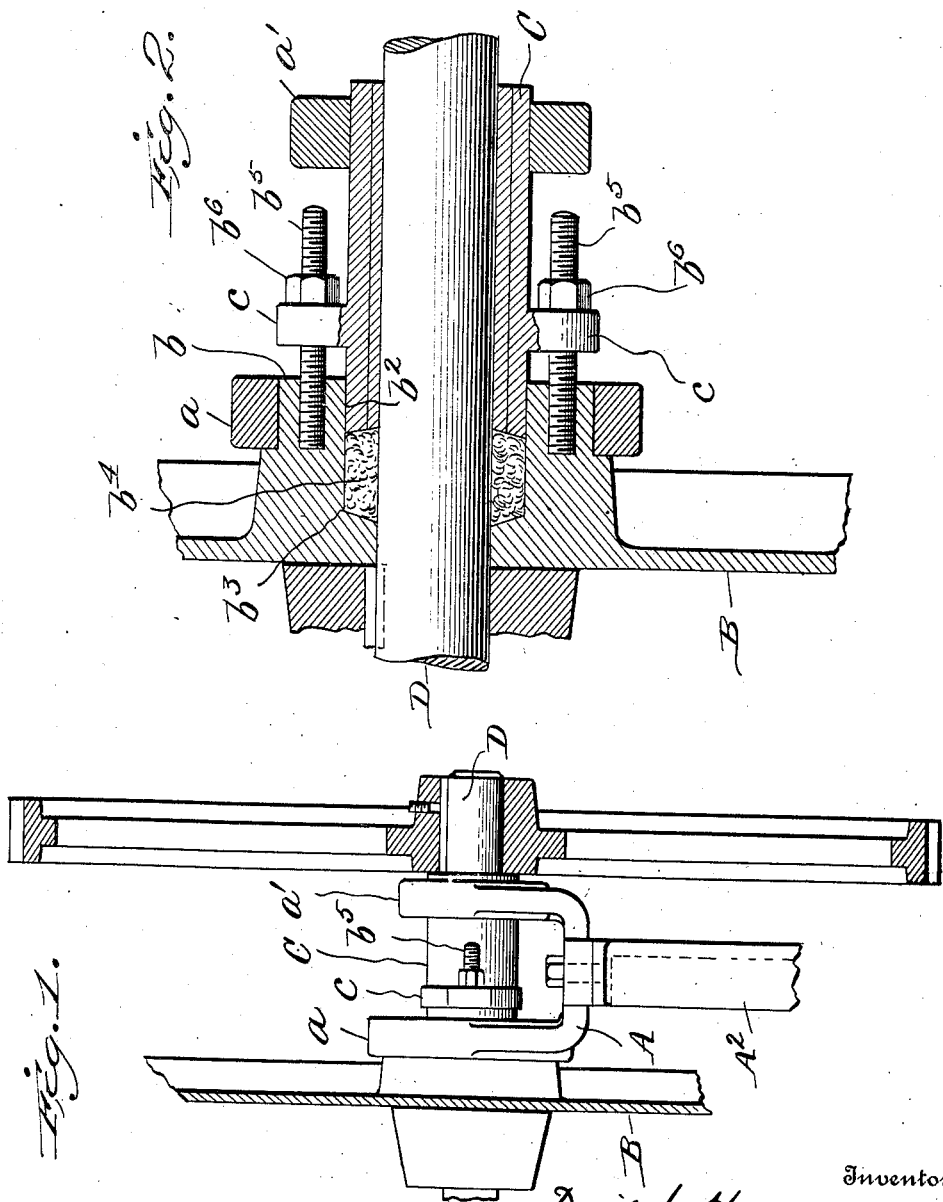

UNITED STATES PATENT OFFICE.

DAVID J. HANNA AND FRANK H. VAN HOUTEN, OF FISHKILL-ON-THE-HUDSON, NEW YORK; SAID VAN HOUTEN ASSIGNOR TO DUTCHESS TOOL COMPANY, OF FISHKILL-ON-THE-HUDSON, NEW YORK, A CORPORATION OF NEW YORK.

BEARING AND PACKING-GLAND FOR MIXING-MACHINES.

1,093,620.  Specification of Letters Patent.  Patented Apr. 21, 1914.

Application filed January 8, 1913. Serial No. 740,835.

*To all whom it may concern:*

Be it known that we, DAVID J. HANNA and FRANK H. VAN HOUTEN, citizens of the United States, residing at Fishkill-on-the-Hudson, in the county of Dutchess and State of New York, have invented certain new and useful Improvements in Bearings and Packing-Glands for Mixing-Machines, and we do hereby declare the following to be a full, clear, and exact description of the same, reference being had to the accompanying drawings, forming part of this specification, and to the figures and letters of reference marked thereon.

This invention relates to improvements in bearings and packing glands for machines for mixing plastic materials, and is especially designed for use in connection with machines for mixing dough. In the type of machine with which this invention is especially designed for use. a revolving shaft carrying the mixing blades passes through a bearing into a bowl or mixing trough, said shaft being submerged in the material being mixed and the bowl or trough being periodically dumped to discharge its contents.

The invention consists in certain novel details of construction and combinations and arrangement of parts, all as will be now described and the particular features of novelty pointed out in the appended claims.

In the accompanying drawings, wherein is illustrated the preferred embodiment of the invention,—Figure 1 is an elevation partly in section showing the invention as applied to a dough mixing machine; Fig. 2 is a longitudinal section.

Similar letters of reference in the several figures indicate the same parts.

Referring to the drawings, the letter A indicates a bracket having two upwardly extending parallel spaced arms $a$, $a'$, bolted to the frame $A^2$ of the machine.

The mixing bowl or receptacle portion only of which is illustrated and lettered B, is provided with a trunnion $b$ which is extended and journaled in the arm $a$ of the bracket A. The trunnion $b$ is centrally perforated to form a bearing for the shaft D, and is also recessed as at $b^2$, to form a packing chamber $b^3$, for packing material $b^4$. The shaft D extends through both arms $a$, $a'$ of the bracket A, and a tubular gland C surrounding the shaft D, extends at one end into the recess $b^2$ in the trunnion B, and at the opposite end is journaled in the other arm $a'$ of the bracket A, the gland forming a bearing for the shaft D. It will be noted that the journal bearing in the arm $a$ of the bracket A, is larger than that in the arm $a'$.

Secured to the trunnion B are screw-threaded stud bolts $b^5$, two being preferably employed located diametrically opposite each other, these bolts passing through projections $c$, $c$, intermediate the ends of the gland and between the bracket arms $a$, $a'$, upon the gland C, nuts $b^6$ being screwed on the ends of the bolts $b^5$, whereby by the adjustment of these nuts, the gland may be adjusted, as will be readily understood.

From the above description it will be seen that, the shaft and trunnion are well packed, and the gland forms a bearing for the shaft that will not be thrown out of true with the shaft, even though the nuts should be unequally adjusted. So, too, the adjusting means is conveniently placed and may be readily manipulated.

Having thus described our invention, what we claim as new and desire to secure by Letters Patent of the United States, is:

1. In a bearing and packing gland for mixing machines, the combination with a bracket having fixed parallel spaced arms carried by the frame of the machine, a dumping member having a trunnion journaled in one of said arms, and being centrally perforated and recessed to form a shaft bearing and packing chamber, a shaft journaled in said bearing and extending through both arms of the bracket, a tubular gland surrounding and forming a bearing for the shaft outside of the trunnion, said gland extending at one end into the recess in the trunnion and at the opposite end being journaled in the outer fixed arm of the bracket, substantially as described.

2. In a bearing and packing gland for mixing machines, the combination with a bracket having parallel spaced arms and carried by and rigid with the frame of the machine, a dumping member having a trunnion journaled in one of said arms, and being centrally perforated and recessed to form a shaft bearing and packing chamber, a shaft journaled in said bearing and extending through both arms of the bracket, a tubular gland surrounding and forming a bearing for the shaft, said gland extending at one end into the recess in the trunnion and at the opposite end journaled in the outer arm of the bracket, and means for adjusting said gland connected thereto intermediate the ends of the gland and between the bracket arms.

DAVID J. HANNA.
FRANK H. VAN HOUTEN.

Witnesses:
JOHN M. VAN HOUTEN,
CLAUDE VAN NOSTRAN.